United States Patent
Seitz et al.

(10) Patent No.: US 9,671,938 B2
(45) Date of Patent: Jun. 6, 2017

(54) NAVIGATING VISUAL DATA ASSOCIATED WITH A POINT OF INTEREST

(71) Applicant: Google Inc., Mountain View, CA (US)

(72) Inventors: Steven Maxwell Seitz, Seattle, WA (US); Andrew Ofstad, San Francisco, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 14/564,688

(22) Filed: Dec. 9, 2014

(65) Prior Publication Data

US 2015/0095831 A1 Apr. 2, 2015

Related U.S. Application Data

(63) Continuation of application No. 13/691,697, filed on Nov. 30, 2012, now Pat. No. 8,928,666.
(Continued)

(51) Int. Cl.
*G06F 3/0484* (2013.01)
*G06T 11/20* (2006.01)
(Continued)

(52) U.S. Cl.
CPC ...... *G06F 3/04842* (2013.01); *G06F 3/04815* (2013.01); *G06F 17/30* (2013.01);
(Continued)

(58) Field of Classification Search
None
See application file for complete search history.

(56) References Cited

U.S. PATENT DOCUMENTS

| 8,406,565 B1 | 3/2013 | Schildan |
| 2007/0024612 A1 | 2/2007 | Balfour |

(Continued)

FOREIGN PATENT DOCUMENTS

| CN | 101506764 A | 8/2009 |
| JP | 2005037717 A | 2/2005 |

(Continued)

OTHER PUBLICATIONS

Stefanidis, "Multilayer Scene Similarity Assessment", 2009 IEEE International Conference on Data Mining Workshops, pp. 625-626.*
(Continued)

*Primary Examiner* — Maurice L McDowell, Jr.
(74) *Attorney, Agent, or Firm* — Lerner, David, Littenberg, Krumholz & Mentlik, LLP

(57) ABSTRACT

Systems and methods for navigating an imagery graph are provided. In some aspects, a first image is provided for display, where the first image corresponds to a first image node within an imagery graph, where the imagery graph comprises image nodes corresponding to images from a plurality of different imagery types, and where each image node in the imagery graph is associated with geospatial data. An indication of a selection of a predetermined region within the first image is received, where the predetermined region is associated with a position in the first image that corresponds to geospatial data associated a second image node within the imagery graph. A second image corresponding to the second image node is provided for display in response to the indication of the selection of the predetermined region.

22 Claims, 14 Drawing Sheets

Related U.S. Application Data

(60) Provisional application No. 61/712,729, filed on Oct. 11, 2012.

(51) Int. Cl.

| | | |
|---|---|---|
| *G06T 11/00* | (2006.01) | |
| *G06F 17/30* | (2006.01) | |
| *G06T 15/20* | (2011.01) | |
| *G06T 17/05* | (2011.01) | |
| *G06T 19/00* | (2011.01) | |
| *G06F 3/0481* | (2013.01) | |

(52) U.S. Cl.
CPC ........ *G06F 17/30244* (2013.01); *G06T 11/00* (2013.01); *G06T 11/20* (2013.01); *G06T 15/205* (2013.01); *G06T 17/05* (2013.01); *G06T 19/003* (2013.01)

(56) References Cited

U.S. PATENT DOCUMENTS

| | | | |
|---|---|---|---|
| 2008/0066000 A1 | 3/2008 | Ofek et al. | |
| 2008/0143727 A1 | 6/2008 | Oh et al. | |
| 2010/0121794 A1* | 5/2010 | Heisele | G06K 9/6219 706/13 |
| 2010/0259550 A1* | 10/2010 | Baumgart | A61B 6/463 345/589 |
| 2011/0130949 A1 | 6/2011 | Arrasvuori | |
| 2011/0173565 A1 | 7/2011 | Ofek et al. | |
| 2011/0320116 A1* | 12/2011 | DeMaio | G01S 17/88 701/457 |
| 2012/0044247 A1 | 2/2012 | Naimark | |
| 2012/0076409 A1 | 3/2012 | Guo | |
| 2012/0127169 A1 | 5/2012 | Barcay et al. | |
| 2012/0169734 A1 | 7/2012 | Snavely et al. | |
| 2012/0216149 A1 | 8/2012 | Kang et al. | |

FOREIGN PATENT DOCUMENTS

| | | |
|---|---|---|
| KR | 1020110068683 | 6/2011 |
| WO | 2008027154 A1 | 3/2008 |

OTHER PUBLICATIONS

Extended European Search Report for EP Patent Application No. 13844655.4, dated Oct. 28, 2015.
Examination Report dated Aug. 2, 2016, for European Patent Application No. 13844655.4.
Chinese Office Action for Application No. 201380063603.X dated Apr. 29, 2016.
Stu Nicholls: "Stu Nicholls | CSS Play | Running with sprites." Dec. 31, 2005, XP055337246. Retrieved from the Internet: <http://web.archive.org/web/20051231022717/http://www.cssplay.co.uk/menu/car.html>. 2 pages.
Summons to Attend Oral Proceedings for European Patent Application No. 13844655.4, dated Feb. 16, 2017.

* cited by examiner

NAVIGATING VISUAL DATA ASSOCIATED WITH A POINT OF INTEREST

CROSS-REFERENCE TO RELATED APPLICATION

The present application is a continuation of U.S. patent application Ser. No. 13/691,697, filed Nov. 30, 2012, which claims benefit of priority under 35 U.S.C. §119 from U.S. Provisional Patent Application Ser. No. 61/712,729 entitled "NAVIGATING VISUAL DATA ASSOCIATED WITH A POINT OF INTEREST," filed on Oct. 11, 2012, the disclosures of which are hereby incorporated by reference in their entirety for all purposes.

BACKGROUND

The subject technology generally relates to visual data processing and, in particular, relates to navigating visual data associated with a point of interest.

Images of points of interest (e.g., landmarks, buildings, or natural wonders) are available on the Internet or in various data stores. The images may include different types of imagery (e.g., street view panoramas, aerial images, satellite images, user images from photograph sharing services, or images from videos), as well as different sets of imagery having the same type. However, the different types of imagery of these points of interest are oftentimes separate and disjoint from one another. As a result, an end-user of a client computing device may be able to see multiple views of the point of interest via the client computing device but may have difficulty navigating between different imagery sets and understanding the images of a specific point of interest within different imagery sets (e.g., street view images of the Empire State Building and user images of the Empire State Building) are interrelated with one another in three-dimensional space. As the foregoing illustrates, a new approach for combining and navigating between multiple imagery sets including visual data associated with a specific point of interest may be desirable.

SUMMARY

The disclosed subject matter relates to a computer-implemented method for navigating an imagery graph. The method includes providing a first image for display, where the first image corresponds to a first image node within an imagery graph, where the imagery graph comprises image nodes corresponding to images from a plurality of different imagery types, and where each image node in the imagery graph is associated with geospatial data. The method includes receiving an indication of a selection of a predetermined region within the first image, where the predetermined region is associated with a position in the first image that corresponds to geospatial data associated a second image node within the imagery graph. The method includes providing a second image corresponding to the second image node for display in response to the indication of the selection of the predetermined region.

The disclosed subject matter further relates to a computer-readable medium. The computer-readable medium includes instructions that, when executed by one or more computers, cause the one or more computers to implement a method for providing an image for display. The instructions include code for providing a first image for display, where the first image corresponds to a first image node within an imagery graph, where the imagery graph comprises plural image nodes, and where each image node in the imagery graph is associated with geospatial data. The instructions include code for receiving an indication of a selection of one or more pixels within the first image, where the one or more pixels are associated with a position in the first image that corresponds to geospatial data associated a second image node within the imagery graph. The instructions include code for providing a second image corresponding to the second image node for display in response to the indication of the selection of the one or more pixels.

The disclosed subject matter further relates to a system. The system includes one or more processors. The system also includes a memory. The memory includes one or more data structures representing a unified imagery graph. The unified imagery graph includes image nodes corresponding to images from a plurality of different imagery types, where each image node in the unified imagery graph is associated with a geographic location, a viewpoint orientation, and a field of view. The memory includes instructions. The instructions include code for providing a first image for display, where the first image corresponds to a first image node within the unified imagery graph, and where the first image has a first imagery type. The instructions include code for receiving an indication of a selection of a predetermined region within the first image, where the predetermined region is associated with a position in the first image that corresponds to a geographic location, a viewpoint orientation, or a field of view associated a second image node within the unified imagery graph. The instructions include code for providing a second image corresponding to the second image node for display in response to the indication of the selection of the predetermined region, where the second image has a second imagery type different from the first imagery type.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
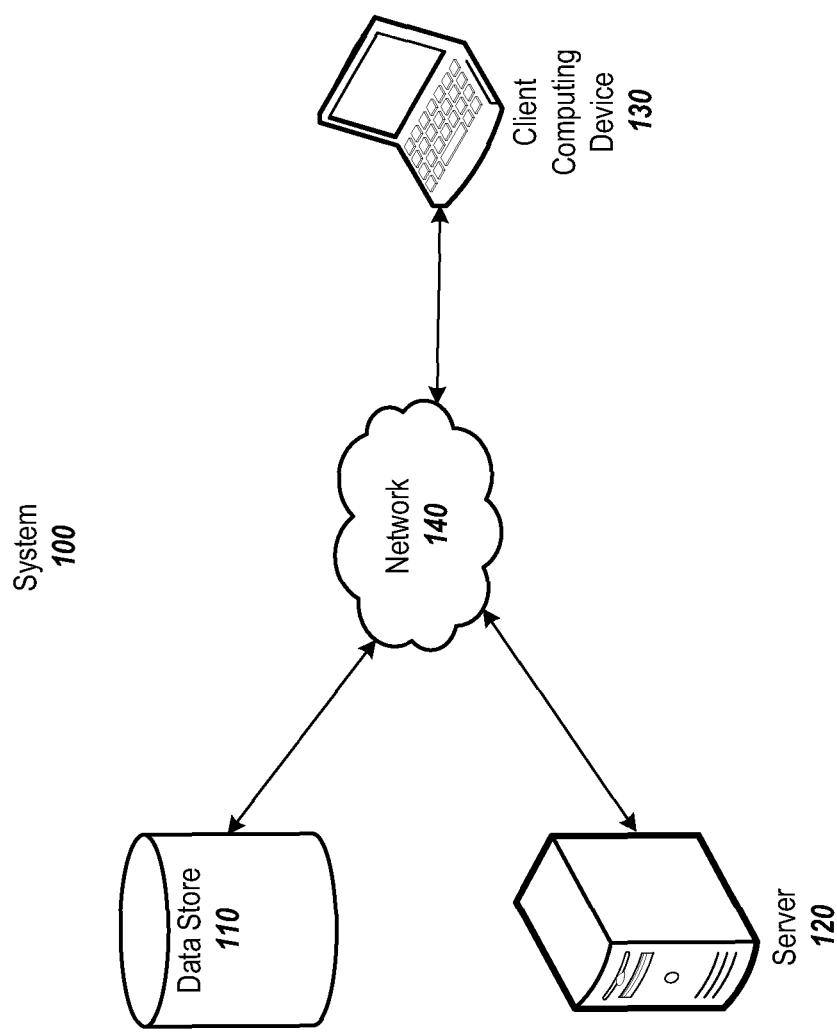
FIG. 1 illustrates an example of a system configured to navigate visual data associated with a point of interest.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

The subject technology is related to navigating visual data associated with a point of interest. In one example implementation, a server provides a first image of the point of interest for display at a client computing device. The first image corresponds to an image node within an imagery graph. The first image includes one or more points of interest (e.g., the Capitol Building or the Washington Monument in Washington, D.C.). The first image may be a member of a first imagery set (e.g., street view images). The server receives an indication of a selection of a point of interest within the first image. For example, the end-user of the client computing device may click on one or more pixels on a point of interest (e.g., on a wall of the Capitol Building). Responsive to the indication of the selection of the point of interest, the server selects, from image nodes associated with the point of interest within the imagery graph, a second image node. The second image node may correspond to an image of the point of interest, for example, an image taken from a viewpoint corresponding to the location on the first image where the end-user selected the point of interest (e.g., the wall of the Capitol Building). The server provides the image corresponding to the second image node for display on the client computing device. The image corresponding to the second image node may be a member of a second imagery set (e.g., user images from photograph sharing services) different from the first imagery set.

In some aspects, the imagery graph includes different types of images (e.g., street view panoramas, aerial images, satellite images, user images from photograph sharing services, or images from videos) from multiple imagery sets (e.g., imagery sets having sources including, for example, public images within social networking services, images within mapping services, public images within photograph sharing services, images from web-based encyclopedias, etc.). Each image within the imagery graph is associated with an image node. The image nodes are connected in the imagery graph based on geographic location data of the associated the image, as well as pose information (e.g., position, orientation, or field of view) associated with the image. However, pose information may not be available for some of the images in the imagery graph.

Advantageously, in some implementations of the subject technology, a user is able to more easily navigate and interact with visual data of a point of interest from multiple imagery sets (e.g., street view panoramas, aerial images, satellite images, user images from photograph sharing services, or images from videos). The user navigation is based on the three-dimensional characteristics of the point of interest such that the user is able to familiarize him/herself with the three-dimensional characteristics of the point of interest, and how the three-dimensional characteristics relate to images within the imagery sets.

FIG. 1 illustrates an example of a system 100 configured to navigate visual data associated with a point of interest. As shown, the system 100 includes a data store 110, a server 120, and a client computing device 130. The data store 110, server 120, and client computing device 130 may be configured to communicate with one another via a network 140. The network 140 may include the Internet, an intranet, a local area network, a wide area network, a wired network, a wireless network, or a virtual private network (VPN).

The data store 110 may store one or more imagery graphs that include images of one or more points of interest. The images may be from multiple imagery sets (e.g., street view panoramas, aerial images, satellite images, user images from photograph sharing services, or images from videos). The data store 110 may include a single machine, multiple machines, a single processor system, or a multi-processor system. One example of the data store 110 is described in more detail in conjunction with FIG. 2 below.

The server 120 may include a module to navigate visual data associated with a point of interest that is stored within the data store 110 or other sources. The server 120 may be implemented as a single machine with a single processor, a multi-processor machine, or a server farm including multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display a webpage configured to navigate visual data associated with a point of interest or include a special-purpose application (e.g., a mobile phone application or tablet computer application) for navigating visual data associated with a point of interest. While only one client computing device 130 is illustrated in FIG. 1, the subject technology may be implemented in conjunction with multiple client computing devices 130.

Figure 2:
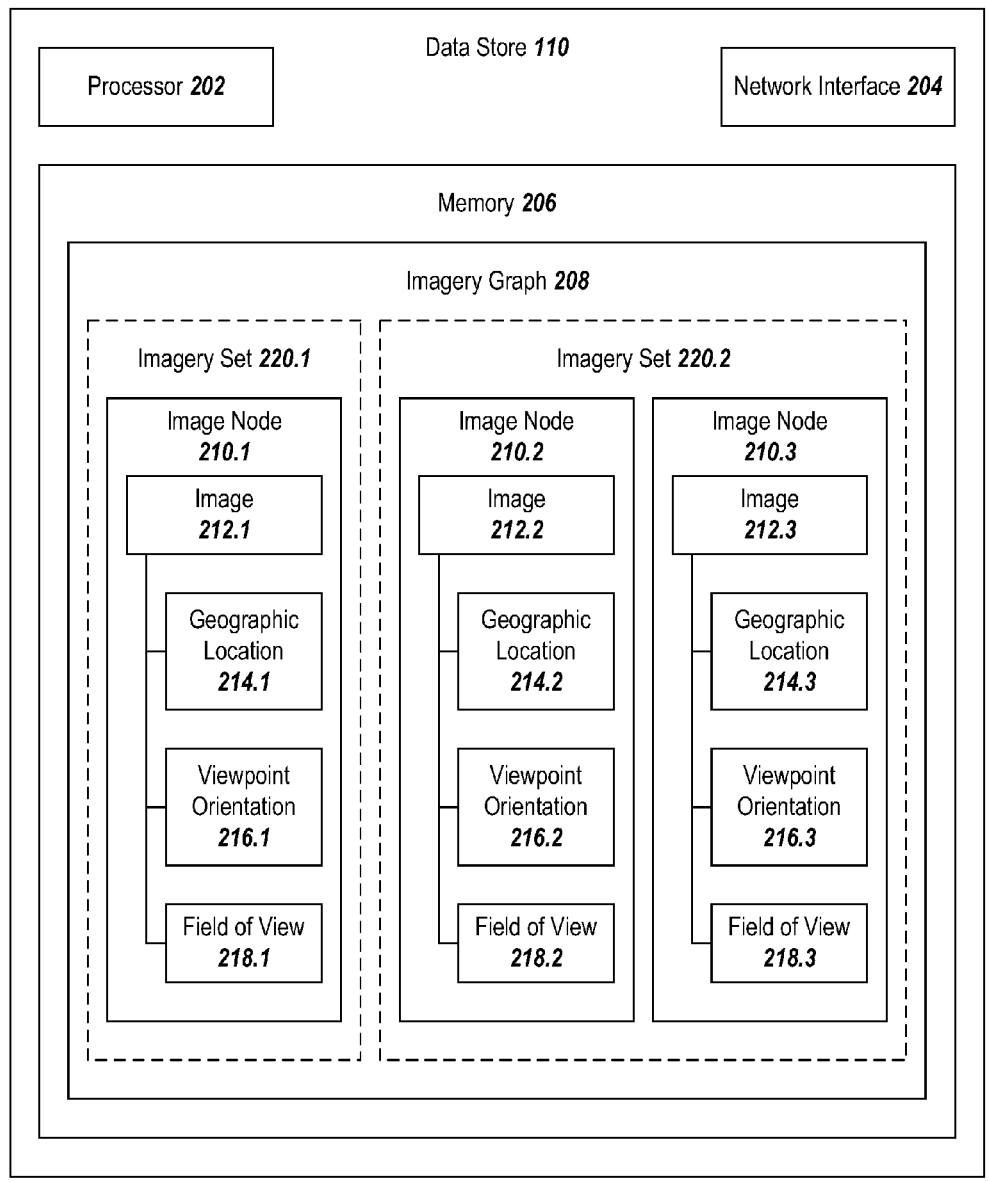
FIG. 2 illustrates an example of the data store of FIG. 1 in more detail.

FIG. 2 illustrates an example of the data store 110 in more detail.

As shown, the data store 110 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the data store 110 may include multiple processors. The network interface 204 is configured to allow the data store 110 to transmit and receive data in a network, e.g., network 140 of FIG. 1. The network interface 204 may include one or more network interface cards (NICs). The memory 206 may store data or instructions. The memory 206 may include a cache memory unit, a storage memory unit, or any other memory unit. As illustrated, the memory 206 includes a data structure representing an imagery graph 208.

While the imagery graph 208 is illustrated as being represented in a unified imagery graph—a single data structure including multiple components (e.g., image nodes 210)—the imagery graph 208 may, alternatively, be represented using multiple data structures, each of which includes at least a portion of the data in the imagery graph 208. The imagery graph 208 includes image nodes 210 from multiple imagery sets 220. The imagery graph 208 also includes representation of geospatial relationships between the images corresponding to the image nodes 210. The geospatial relationships are defined based on geographic location data of the associated the image, as well as pose information (e.g., position, orientation, or field of view) associated with the image. However, pose information may not be available for some of the images in the imagery graph 208. Each imagery set 220 may include one or more image nodes 210. Example imagery sets 220 include street view panoramas, aerial images, satellite images, user images from photograph sharing services, or images from videos. While imagery set 220.1 is illustrated as including one image node 210.1, and imagery set 220.2 is illustrated as including two image nodes 210.2-3, the subject technology may be implemented with imagery sets that include multiple image nodes, for example, 50 image nodes, 500 image nodes, or 5000 image nodes. Furthermore, while only two imagery sets 220.1-2 are illustrated, the subject technology may be implemented with any number of imagery sets. The imagery sets 220 may include different types of images. For example, one imagery set 220 may include aerial images and satellite images, while another imagery set may include street view panoramas, and yet another imagery set may include user images from a photograph or video sharing service.

As set forth above, a unified imagery graph may include, among other things, a single data structure that includes multiple components (e.g., image nodes 210) for representing images from multiple different image sets (e.g., public images in a social networking service or another source, images in a mapping service, images in a web-based encyclopedia, etc.). The unified imagery graph may include the images within the data structure or the unified imagery graph may include links (e.g., uniform resource indicators (URIs) or references to locations in memory) to the images in the unified imagery graph. In some aspects, a unified imagery graph is associated with a specific geographic location (e.g., the White House in Washington, D.C.) and includes multiple images of the geographic location from multiple different image sets. The unified imagery graph includes nodes representing the images and edges representing connections between the images (e.g., expanding or narrowing a viewing angle, moving a camera position from one point to another, etc.).

As set forth above, the imagery graph 208 (e.g., the unified imagery graph) can include public images from multiple sources, for example, social networking service(s) or photograph sharing service(s). Images are not included in the imagery graph 208 without receiving appropriate permissions from a user who uploaded the image to the network, server, or data repository. Visibility of an image may be controlled by the user who uploaded the image (e.g., the user may restrict visibility to his/her social contacts in the social networking service). Furthermore, unless appropriate permissions are received from a person depicted in the image, the face of the person in the image is blurred to protect his/her privacy.

As illustrated, each image node 210 includes an image 212. The image 212 may be, for example, a photograph taken by a camera, an image derived based on a three-dimensional model, or a shot from a video. In some aspects, the image is associated with a geographic location 214, a viewpoint orientation 216, and a field of view 218. In some aspects, one or more of the geographic location 214, the viewpoint orientation 216, or the field of view 218 for the image is unavailable. Images are organized in the imagery graph 208 based on their geographic location(s), viewpoint orientation(s), or field(s) of view. The geographic location 214 may be based on a geographic tag within the image. The geographic location 214 may be represented as a latitude and longitude or as a street address. The geographic location 214 may be coupled with an accuracy radius (e.g., 100 meters). The geographic location may correspond to the precise two-dimensional or three-dimensional position of the optical center of the image. The viewpoint orientation 216 may include a direction in which a viewpoint is directed. For example, if a photograph is taken while the lens of a camera is turned north, the viewpoint orientation 216 may be north. The viewpoint orientation 216 may be expressed as a direction (e.g., southeast) or as an angle (e.g., 135 degrees east of north/clockwise from north). The viewpoint orientation may have three angles (pan, tilt, and yaw) or one or more of these three angles. The field of view 218 may be expressed as an angle covered by a camera, e.g., an angle between a left or top edge of a photograph, a camera lens, and a right or bottom edge of a photograph. The field of view may be expressed as an angle (e.g., 45 degrees) or as multiple angles (e.g., 30 degrees left to right and 105 degrees top to bottom). In some aspects, the geographic location, viewpoint orientation, or field of view are obtained via computer vision techniques.

Figure 3:
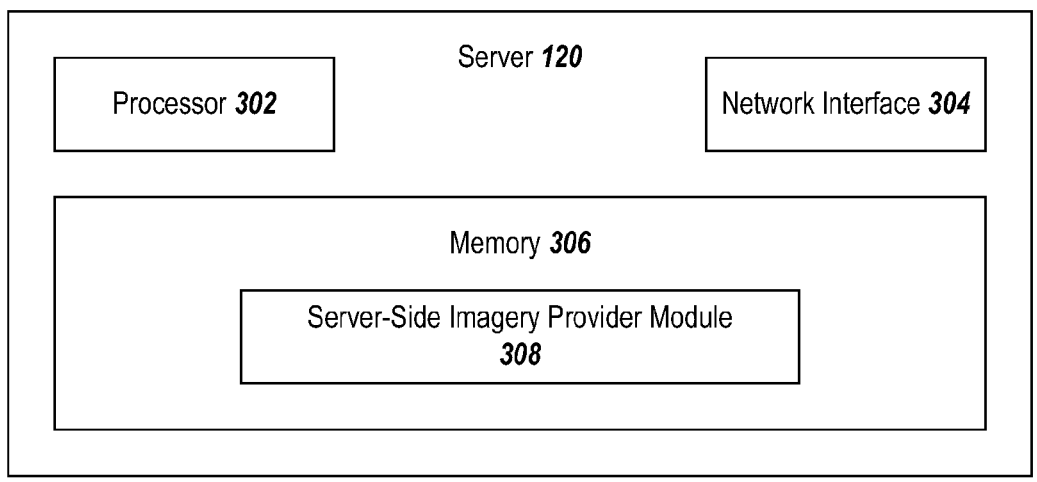
FIG. 3 illustrates an example of the server of FIG. 1 in more detail.

FIG. 3 illustrates an example of the server 120 in more detail.

As shown, the server 120 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 120 may include multiple processors. Furthermore, while the server 120 is illustrated as a single machine, the server 120 may include multiple machines, e.g., within a server farm. The network interface 304 is configured to allow the server 120 to transmit and receive data in a network, e.g., network 140 of FIG. 1. The network interface 304 may include one or more network interface cards (NICs). The memory 306 may store data or instructions. The memory 306 may include a cache memory unit, a storage memory unit, or any other memory unit. As illustrated, the memory 306 includes a server-side imagery provider module 308.

The server-side imagery provider module 308 is configured to navigate visual data associated with a point of interest. The server-side imagery provider module 308 includes instructions to provide a first image (e.g., image 212.1) for display. The first image corresponds to an image node (e.g., image node 210.1) within an imagery graph (e.g., imagery graph 208). The first image may include one or more points of interest (e.g., the Capitol Building and the Washington Monument). The server-side imagery provider module 308 also includes instructions to receive an indication of a selection of a predetermined region within the first image (e.g., a mouse click on the predetermined region). The predetermined region is associated with a position in the first image that corresponds to geospatial data (e.g., a geographic location, a viewpoint position, or a viewpoint orientation) associated with a second image node. The server-side imagery provider module 308 also includes instructions to provide a second image (e.g., image 212.2) corresponding to the second image node for display in response to the indicated selection of the predetermined region. While the server-side imagery provider module 308 is illustrated in FIG. 3 as a single module, the server-side imagery provider module 308 may also be implemented as multiple modules with each of the multiple modules being configured to carry out or provide for carrying out of all or a portion of the instructions described above.

In some aspects, the server-side imagery provider module 308 is configured to interact with a client-side imagery viewer module executing on the client computing device 130. For example, the indication of the selection of the predetermined region may come from the client-side imagery viewer module executing on the client computing device 130. The first image or the second image may be displayed via the client-side imagery viewer module executing on the client computing device 130. The server-side imagery provider module 308 provides, to the client-side imagery viewer module, image(s) along with navigation controls, which allow a user of the client computing device 130 to select and receive additional imagery from the data store 110, via the server 120, using the navigation controls. Example navigation controls are discussed below in conjunction with FIGS. 5A-5B and FIGS. 7A-7F. The client-side imagery viewer module may be either a standalone application (e.g., a mobile phone application, a tablet computer application, or an application executing on a laptop or desktop computer) or a component of an application (e.g., a component of a browser, a browser application, or a browser plug-in).

Figure 4:
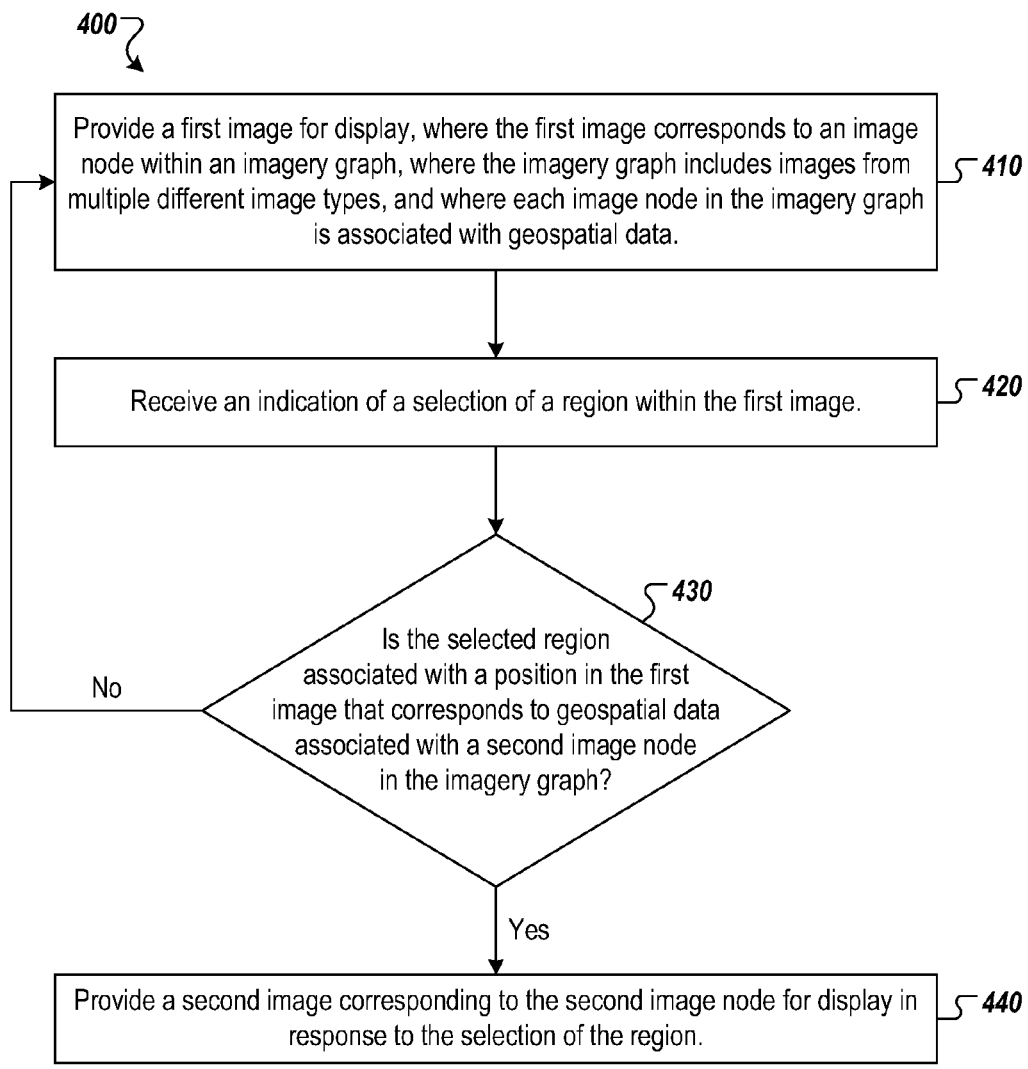
FIG. 4 illustrates an example process by which visual data associated with a point of interest may be navigated.

FIG. 4 illustrates an example process 400 by which visual data associated with a point of interest may be navigated.

The process 400 begins at step 410, where the server (e.g., server 120, by operation of the server-side imagery provider module 308) provides a first image for display on a client computing device (e.g., client computing device 130). The first image (e.g., image 212.1) corresponds to an image node (e.g., image node 210.1) within an imagery graph (e.g., imagery graph 208). The imagery graph includes images from multiple different image types (e.g., photographs, depth-enhanced images, panoramic images, aerial images, satellite images, or video images) and images from multiple different image sets (e.g., public images in a social networking service, images in a mapping service, images in a web-based encyclopedia, etc.). Each The first image may include one or more points of interest. The imagery graph may include image nodes. Each image node in the imagery graph is associated with an image and geospatial data (e.g., geographic location, viewpoint orientation, or field of view) for the image node.

The imagery graph includes multiple image nodes. In some aspects, each image node in the imagery graph includes a corresponding image and corresponding geographic location. The corresponding image is associated with a viewpoint position relative to a depicted point of interest, a viewpoint orientation, and a field of view. If an image includes a point of interest having a known geographic location (e.g., the White House has a known geographic location, which may be represented as a street address or a latitude and longitude) and the image is associated with a geographic location (e.g., a geographic location tag), the viewpoint orientation may be determined by comparing the geographic location associated with the image and the known geographic location of the point of interest. For example, if a photograph of the White House is taken from a geographic location that is known to be west of the White House, it may be determined that the viewpoint orientation is facing east, toward the White House. Alternatively, the viewpoint orientation may be stored in association with the image (e.g., in a tag coupled of the image). In some aspects, the geographic location, viewpoint orientation, or field of view of image(s) in the imagery graph are obtained via computer vision techniques.

In step 420, the server receives an indication of a selection of a region (e.g., one or more pixels) within the first image. For example, the end-user of the client computing device may click the mouse on pixels corresponding to the region or touch pixels corresponding to the region on a touch screen. The region could correspond to all or a portion of a point of interest (e.g., a depiction of the Statue of Liberty in a photograph). The region could correspond to geospatial data in the image (e.g., a point on the north side of the Statue of Liberty could correspond to viewing the Statue of Liberty from the north). The selected region could correspond to a click target. For example, a first image corresponding to a front view of the White House may include a click target (i.e., a region indicating that it can be selected) at the right corresponding to moving to a right-side view of the White House, and a click target at the door corresponding to moving to an interior view of the White House. The click target could be represented by a three-dimensional arrow or by dotted lines indicating that the region pointed to by the three-dimensional arrow or within the dotted lines can be selected (e.g., clicked with a mouse or touched on a touch screen) by the user.

In some examples, a click target may not initially be indicated at all. When a user hovers a cursor over the click target, an indication of the click target (e.g., the three-dimensional arrow or the dotted lines) may appear or the cursor may change shape (e.g., becoming larger or becoming the three-dimensional arrow) to provide a notification to the user that a click target is available.

In step 430, the server determines whether the selected region is associated with a position in the first image that corresponds to geospatial data associated with a second image node in the imagery graph. Such a position in the first image that corresponds to geospatial data associated with a second image may correspond to a click target. If so, the process 400 continues to step 440. If not, the process 400 returns to step 410.

In step 440, the server provides a second image corresponding to the second image node for display in response to the selection of the region. The second image node is associated with the position of the selected region on the first image. For example, if the selected region includes a portion of a point of interest, the second image could be an image of the point of interest. If the selected region is on the east side of the point of interest, the second image could be a view from the east of the point of interest. The second image may be of a different imagery type than the first image. For example, the first image may be an aerial image, and the second image may be a street view panorama. Alternatively, the first image and the second image may be of the same imagery type.

In some aspects, the click target is a user-interface element for selecting a predetermined position on an image. For example, a click target may represent an image node in the imagery graph that is selectable from an image that is currently displayed. A cursor may transform into a shape different form its usual shape (e.g., into a three dimensional arrow or an arrow larger than a typical cursor arrow) when placed over one of the click targets to communication information to the user that the cursor is hovering over a click target, and that additional image(s) associated with the click target are available. Alternatively, the cursor is not transformed when hovering over the click target, and click target(s) are represented via fixed three-dimensional arrow(s) or dotted lines, for example, as shown in FIGS. 7A-7F.

In one example, the first image corresponding to the first image node (e.g., image node 210.1) is from a first imagery set (e.g., 220.1) within the multiple imagery sets and the second image corresponding to the second image node (e.g., image node 210.2) is from a second imagery set (e.g., imagery set 220.2) within the multiple imagery sets. For example, the first image may correspond to satellite image from a satellite imaging service, and the second image may correspond to a screen shot from a video in a video sharing service. After step 440, the process 400 ends.

In one example aspect, instructions for implementing the steps 410-440 in the process 400 may be stored in a memory of a computer and may be implemented by one or more computers. The steps 410-440 in the process 400 may be carried out in series. Alternatively, two or more of the steps 410-440 in the process 400 may be carried out in parallel.

Figure 5A:
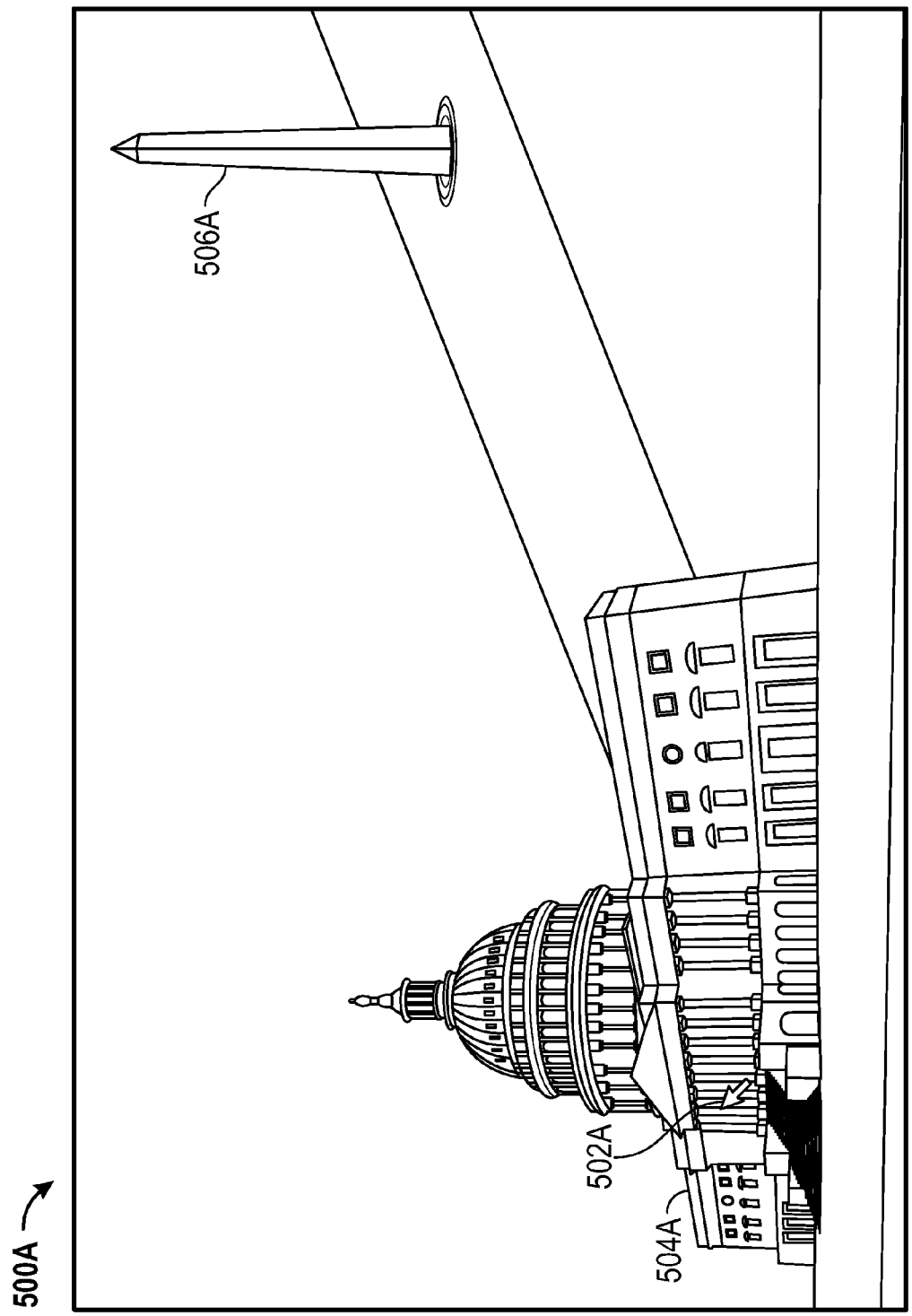
FIGS. 5A-5B illustrate example visual data associated with a point of interest.
Figure 5B:
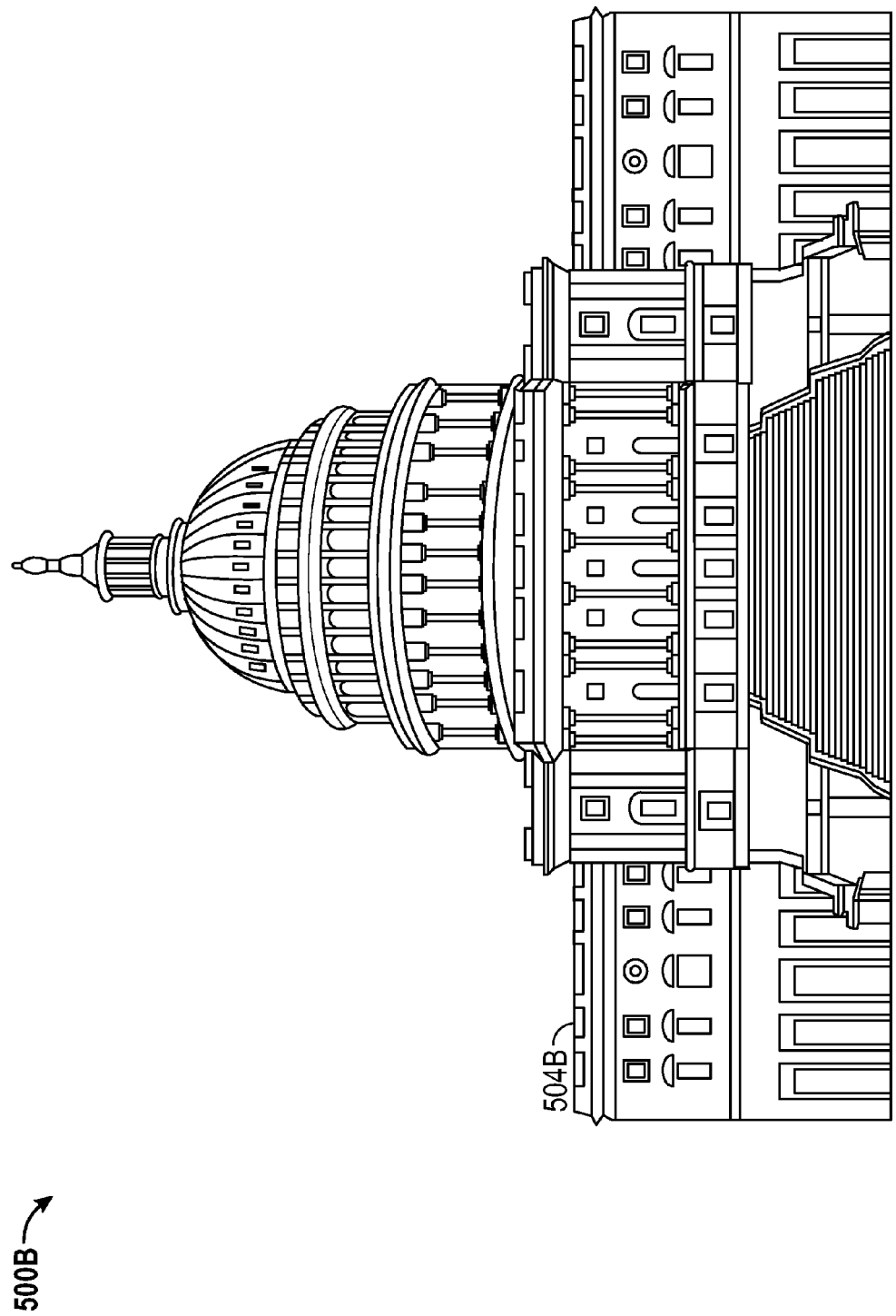

FIGS. 5A-5B illustrate example visual data 500A and 500B associated with a point of interest.

In one example aspect, image 500A of FIG. 5A may be presented to a user of a client computing device, for example, in response to a search for images of the Capitol Building, images of the Washington Monument, or images of landmarks in Washington, D.C. Image 500A corresponds to an image node in an imagery graph (e.g., imagery graph 208). Image 500A may be an aerial photograph. Image 500A may include two points of interest: the Capitol Building 504A and the Washington Monument 506A. A user may select one of the points of interest 504A or 506A, for example, by using the cursor 502A. As shown in FIG. 5A, the user is in the process of selecting the Capitol Building 504A on one side (e.g., the front side) of the Capitol Building 504A using the cursor 502A, which may be associated with a mouse. In an alternative implementation, the user may select a point of interest 504A or 506A by touching the point of interest 504A or 506A with his/her finger on a touch screen.

In response to the user's selection of the Capitol Building 504A on the one side of the Capitol Building 504A, image 500B of FIG. 5B may be presented to the user of the client computing device. The server may associate the user's selection of the Capitol Building 504A with an image node in the imagery graph corresponding to image 500B, as image 500B is an image of the Capitol Building from a position corresponding to the position of the cursor 502A in the image 500A of FIG. 5A. Image 500B may be a user photograph or a street view panorama. As shown, image 500B includes a view of the Capitol Building 504B (which corresponds to the Capitol Building 504A) from the one side of the Capitol Building, which was selected by the cursor 502A in image 500A of FIG. 5A.

Figure 6:
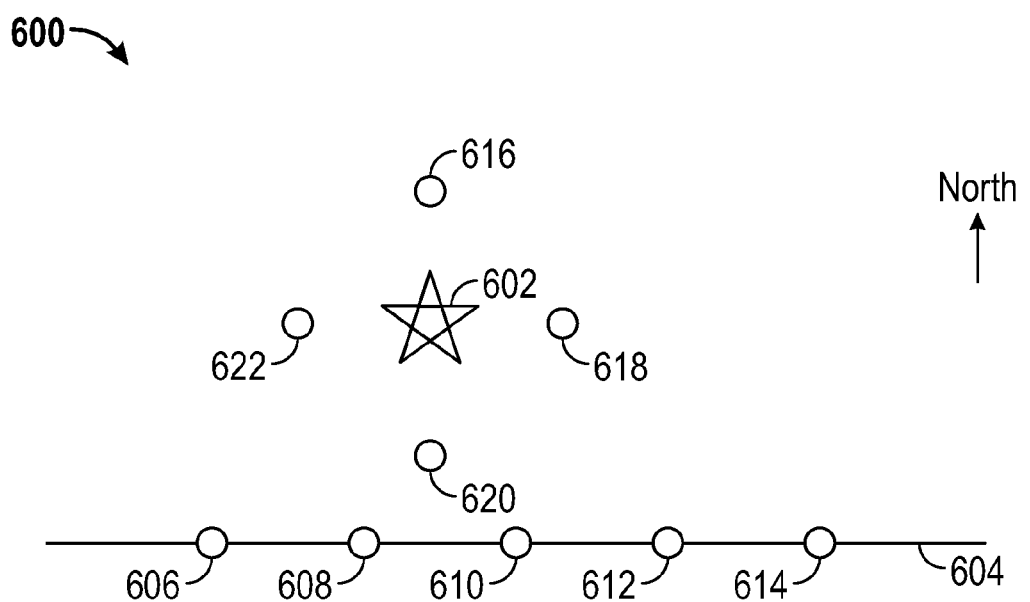
FIG. 6 illustrates an example imagery graph.
Figure 7A:
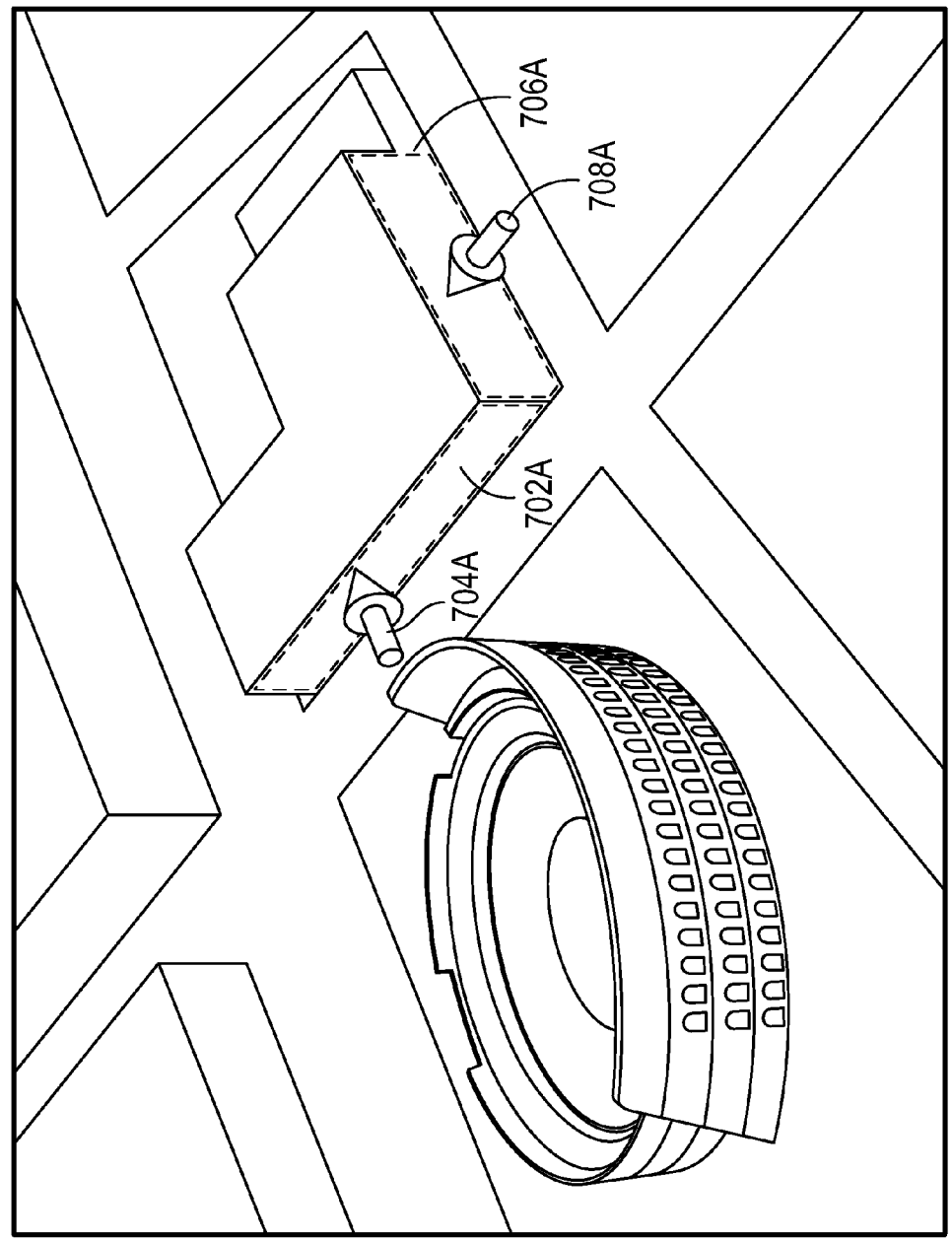
FIGS. 7A-7F illustrate example click targets within visual data associated with a point of interest.
Figure 7B:
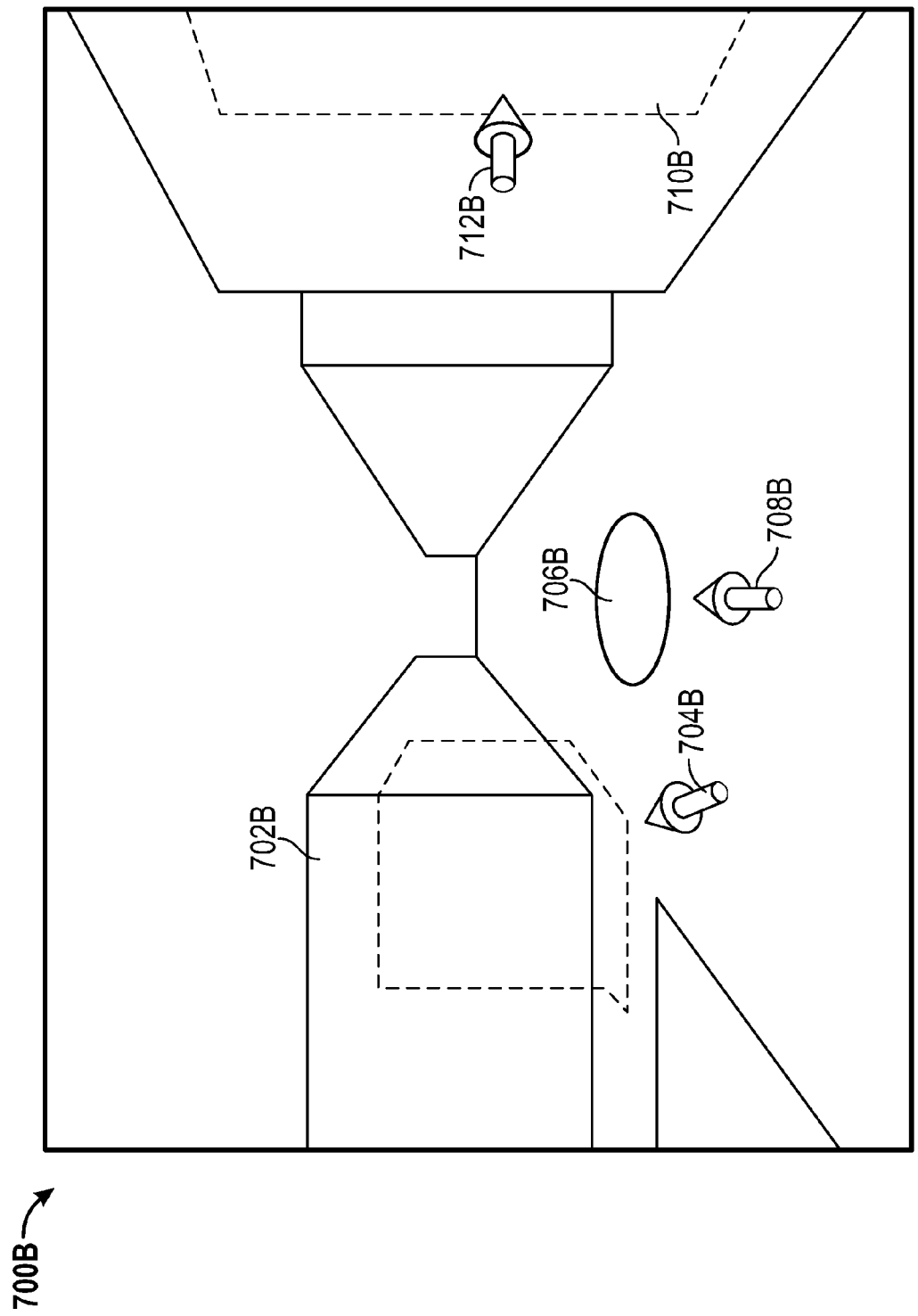
Figure 7C:
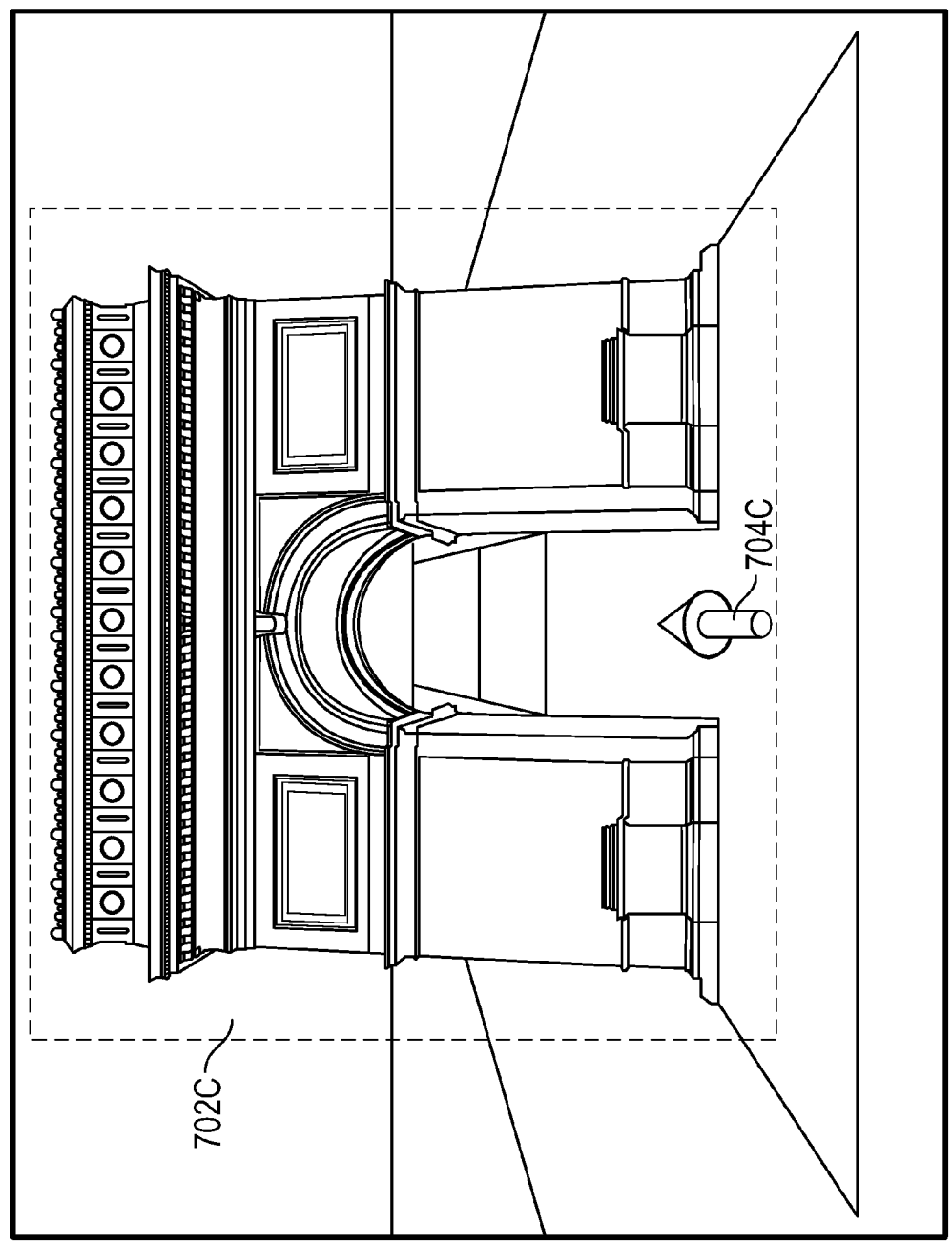
Figure 7D:
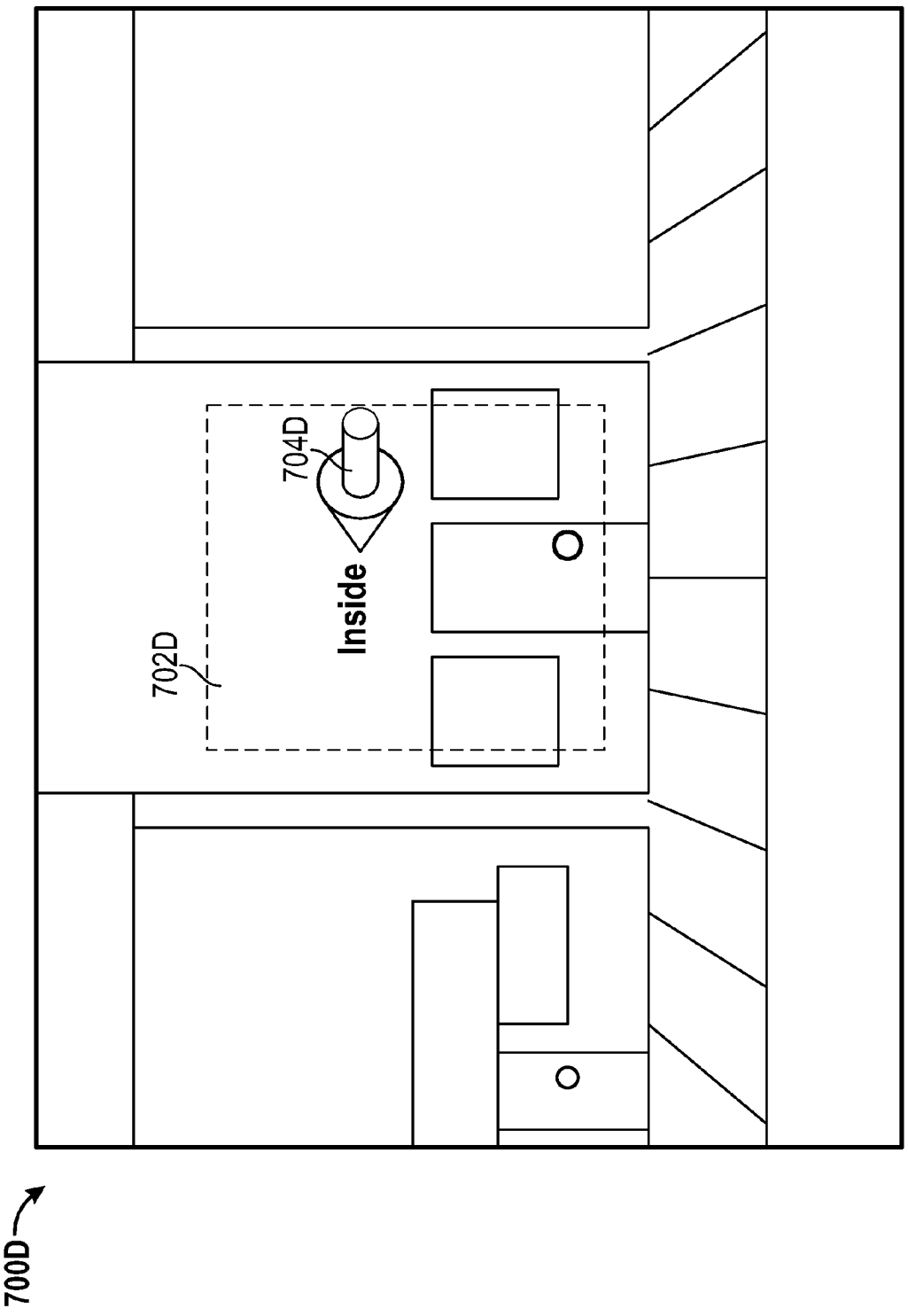
Figure 7E:
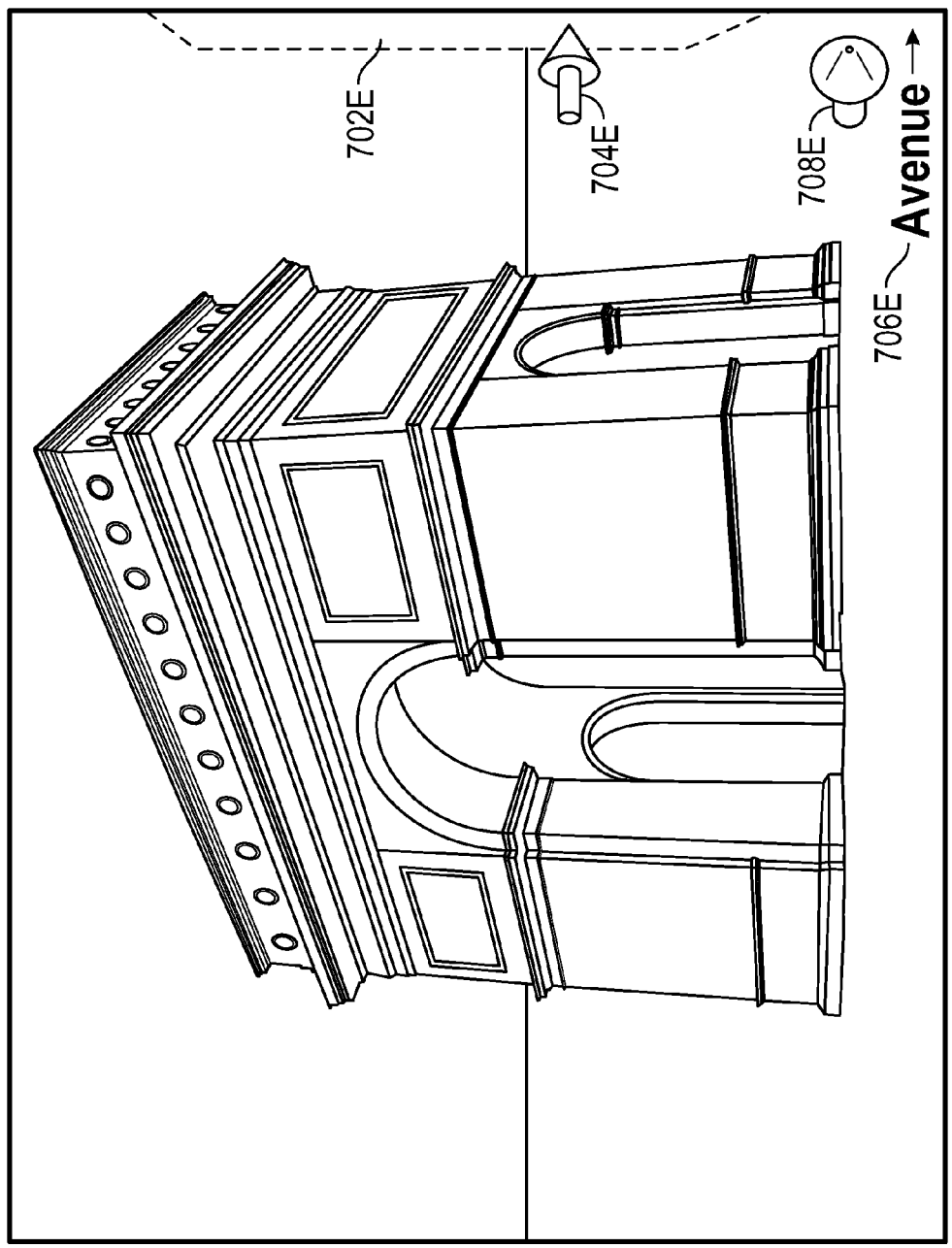
Figure 7F:
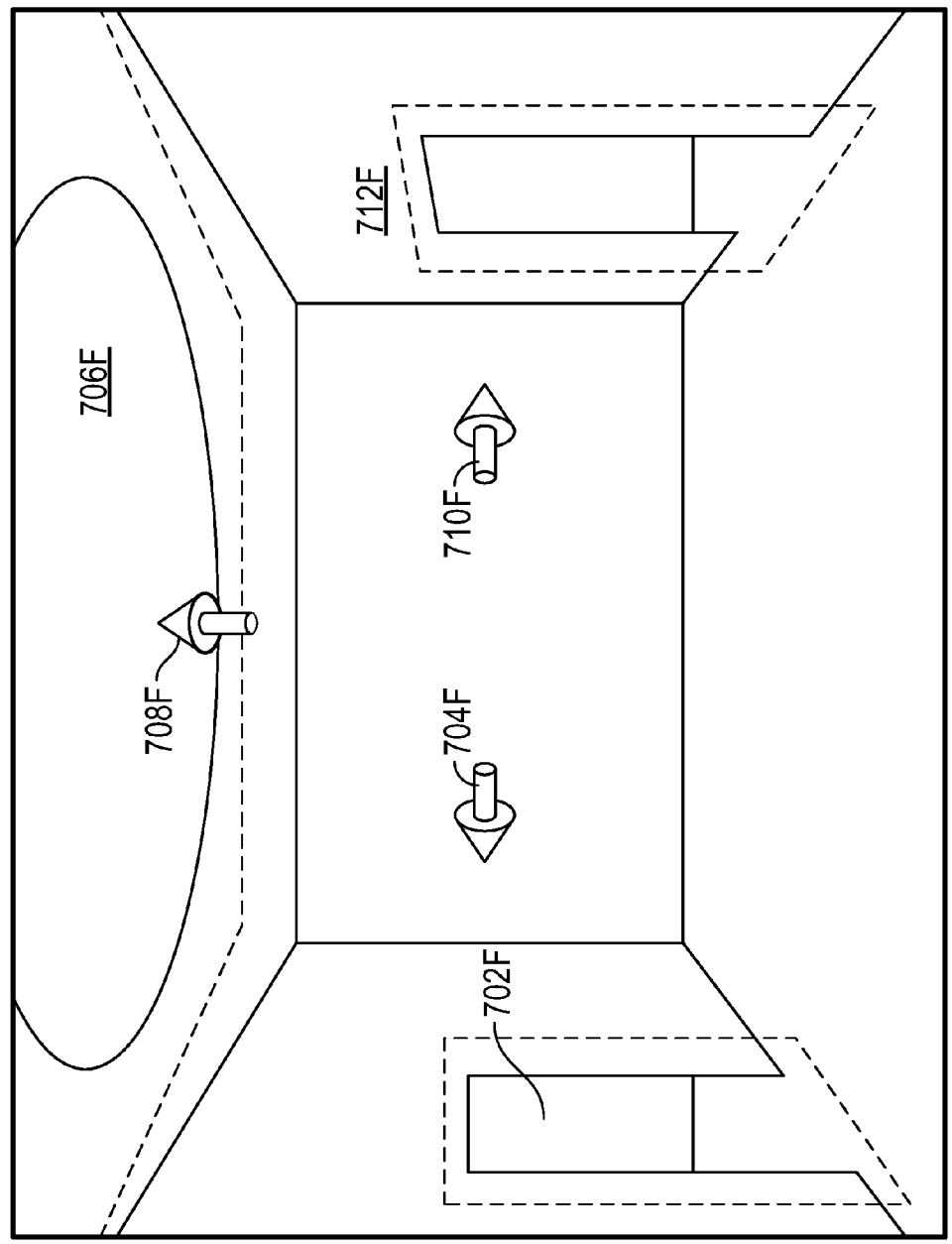

FIG. 6 illustrates an example imagery graph 600.

As shown, the imagery graph 600 indicates a position of a point of interest 602 (indicated with a star) and a position of a street 604. The imagery graph 600 also includes street view panoramas 606, 608, 610, 612, 614 taken on the street 604 and user photographs 616, 618, 620, and 622 of the point of interest 602. The street 604 runs from east to west and the point of interest 602 is positioned north of the street 604.

In one example aspect, a user of a client computing device may be viewing the point of interest 602 from a north-facing street view panorama 610. While looking at the north-facing street view panorama 610, the user may become interested in what the point of interest 602 looks like from the right (east) side. Accordingly, the user may select a point on the right (east) side of the point of interest 602 in the street view panorama 610. In response, the server may provide the user photograph 618 of the point of interest 602 taken from the east side of the point of interest 602 for display.

In another example aspect, while viewing the north-facing street view panorama 610 of the point of interest 602, the user may want to see a more detailed or zoomed-in view of the point of interest 602. Accordingly, the user may select a point on the point of interest 602 about which he/she wants more detail (e.g., a door or window of a building, a head of a statue, etc.). In response, the server may provide the user photograph 620 of the point of interest 602, which includes a more detailed or zoomed-in view of the point of interest 602, for display.

FIGS. 7A-7F illustrate example click targets within visual data 700A, 700B, 700C, 700D, 700E, and 700F associated with a point of interest.

As shown, image 700A includes click targets 702A and 706A. The click targets 702A and 706A are indicated by three-dimensional arrows 704A and 708A, respectively. The three-dimensional arrows 704A or 708A may indicate a viewpoint orientation for an image to be displayed in response to the user selecting the click targets 702A or 706A, respectively. For example, if click target 702A is selected, a bottom left wall of the building in image 700A may be displayed in greater detail. If click target 706A is selected, a bottom right wall of the building in image 700A may be displayed in greater detail. The images presented responsive to selections the click targets 702A and 706A may be from different imagery types from one another and/or from a different imagery type than image 700A. The imagery types may include photographs, depth-enhanced images, panoramic images, aerial images, satellite images, or video images. For example, image 700A may correspond to an aerial photograph, while images corresponding to the click targets 702A or 706A may be panoramic images or photographs. Furthermore, the image 700A may be from a different imagery set than the images associated with the click targets 702A or 706A. The images associated with the click targets 702A and 706A may be from different imagery sets. Imagery sets may include public images from a social networking service, images from a mapping service, web-based encyclopedia images, etc. As shown in FIGS. 7A-7F, click targets are indicated by three-dimensional arrows. However, other graphics can be used, in place of or in addition to the three-dimensional arrows, to indicate click targets.

Image 700B includes click targets 702B, 706B, and 710B indicated by three-dimensional arrows 704B, 708B, and 712B, respectively. The three-dimensional arrows 704B, 708B, and 712B may indicate directions of motion from the image 700B to the images resulting from selecting the click targets 702B, 706, or 710B, respectively. For example, click target 706B, indicated by forward-pointing arrow 708B, may correspond to moving forward. Click target 702B, indicated by arrow 704B, may correspond to moving forward and slightly to the left, in the direction indicated by arrow 704B. Click target 710B, indicated by right-pointing arrow 712B, may correspond to moving to the right. Image 700B may be a street view panorama, images corresponding to the click targets 702B and 710B may be photographs, and an image corresponding to click target 706B may be an aerial image.

Image 700C includes click target 702C and three-dimensional arrow 704C. Click target 702C may correspond to a zoomed-in view of the arc point of interest, as indicated by arrow 704 and the region 702C. Image 700C may be a street view panorama, while an image corresponding to click target 702C may be a depth-enhanced image.

Image 700D includes click target 702D and three-dimensional arrow 704D. The three-dimensional arrow 704D points into the building point of interest, indicating that click target 702D corresponds to viewing the interior of the building point of interest. In order for the server to provide images of the interior of the building point of interest, the owner and the occupant of the building have provided proper permissions for the server and data store to store such images and to provide such images to users of client computing devices. The image 700D may be a depth-enhanced image, while an image corresponding to click target 702D may be a photograph.

Image 700E includes a click target 702E for viewing a scene to the right of the scene in image 700E, as indicated by the three-dimensional arrow 704E and a click target 706E for viewing an avenue scene behind the scene in image 700E, as indicated by the backward-pointing three-dimensional arrow 708E. Image 700E may be from a set of depth-enhanced images, while the images associated with the click targets 702E and 706E may be public photographs stored within a social networking service or street view panoramas stored within a mapping service.

Image 700F includes a scene within a room. Click target 702F is for viewing a scene in an adjacent room to the left, as indicated by three-dimensional arrow 704F. Click target 712F is for viewing a scene in an adjacent room to the right, as indicated by three-dimensional arrow 710F. Click target 706F is for viewing the ceiling of the room in greater detail, as indicated by three-dimensional arrow 708F. The image 700F may be from a different image set or a different image type from the images associated with the click targets 702F, 706F, and 712F.

Figure 8:
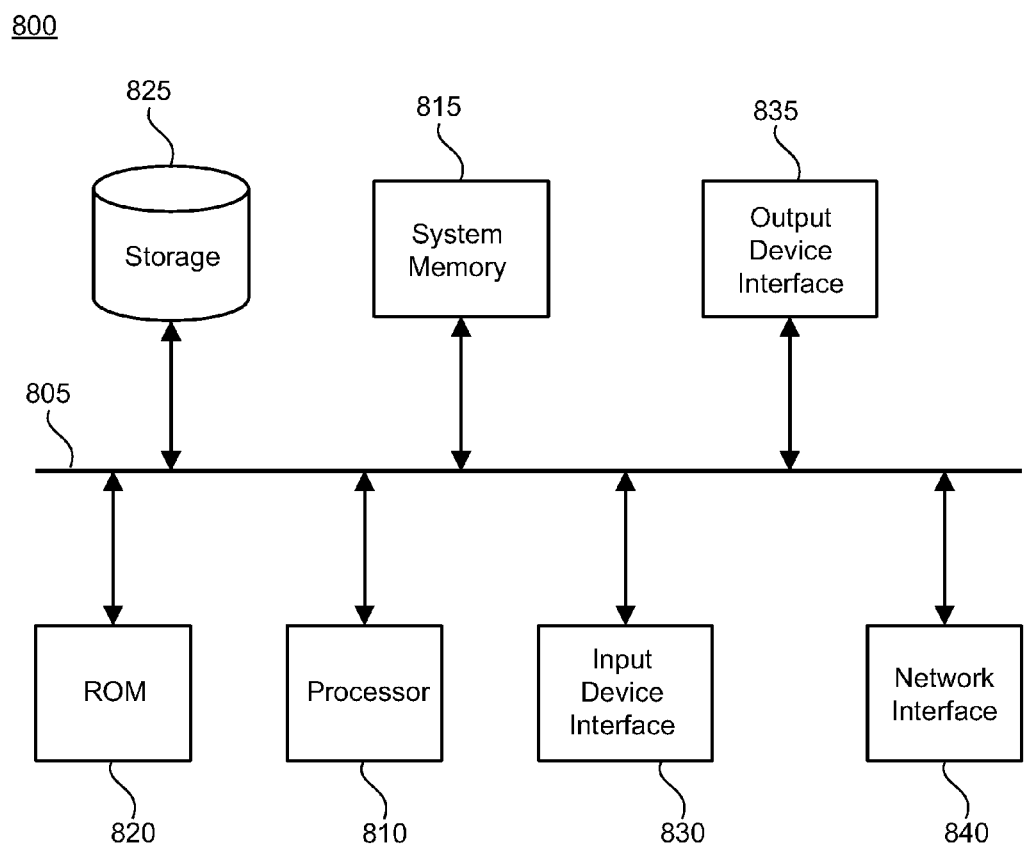
FIG. 8 conceptually illustrates an example electronic system with which some implementations of the subject technology are implemented.

FIG. 8 conceptually illustrates an electronic system 800 with which some implementations of the subject technology are implemented. For example, one or more of the data store 110, the server 120, or the client computing device 130 may be implemented using the arrangement of the electronic system 800. The electronic system 800 can be a computer (e.g., a mobile phone, PDA), or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (for example a magnetic or optical disk and its corresponding disk drive) as the permanent storage device 825.

Other implementations use a removable storage device (for example a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, or the read-only memory 820. For example, the various memory units include instructions for navigating visual data associated with a point of interest in accordance with some implementations. From these various memory units, the processing unit(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, for example cathode ray tubes (CRT) or liquid crystal displays (LCD). Some implementations include devices for example a touchscreen that functions as both input and output devices.

Finally, as shown in FIG. 8, bus 805 also couples electronic system 800 to a network (not shown) through a network interface 840. In this manner, the electronic system 800 can be a part of a network of computers (for example a local area network ("LAN"), a wide area network ("WAN"), or an Intranet, or a network of networks, for example the Internet. Any or all components of electronic system 800 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for navigating imagery graphs, the method comprising:
   receiving, by one or more processors, an indication of a selection of a region within a first image, wherein the region is associated with a position in the first image that corresponds to first geospatial data;
   accessing, by the one or more processors, a data store containing an imagery graph, the imagery graph including at least one imagery set, each imagery set having one or more image nodes, and each image node including an image that is associated with one or more of a geographic location, a viewpoint orientation and a field of view, wherein the first image corresponds to a first image node within the imagery graph;
   identifying, by the one or more processors, a second image node within the imagery graph based on a comparison of the first geospatial data to second geospatial data associated with the second image node; and
   providing, by the one or more processors, a second image corresponding to the second image node for display in response to receiving the indication of the selection of the region within the first image and the identification of the second image node.

2. The method of claim 1, wherein the imagery graph includes representations of geospatial relationships between images of the imagery graph and identifying the second image node is further based on the representations.

3. The method of claim 1, wherein the first image node and the second image node are included in different imagery sets of the imagery graph.

4. The method of claim 3, wherein the different imagery sets store different types of imagery including at least one of a street view panorama, an aerial image, a satellite image, an image from a photograph sharing service, or an image from a video.

5. The method of claim 1, wherein the imagery graph comprises a single data structure including a plurality of image nodes and edges representing connections between the images, wherein identifying the image node is further based on at least one of the edges.

6. The method of claim 1, further comprising:
   receiving indicia of a cursor being hovered within the region; and
   providing a notification that the second image is available responsive to the indicia of the cursor being hovered within the region.

7. The method of claim 6, wherein the notification comprises a transformation of a shape of the cursor.

8. The method of claim 1, wherein images are organized within the imagery graph based on at least one of their respective geographic location, viewpoint orientation, or field of view.

9. The method of claim 1, wherein the geographic location of a given image in the imagery graph is be based on a geographic tag within the given image.

10. A system for navigating imagery graphs, the system comprising one or more processors configured to:
    receive an indication of a selection of a region within a first image, wherein the region is associated with a position in the first image that corresponds to first geospatial data;
    access a data store containing an imagery graph, the imagery graph including at least one imagery set, each imagery set having one or more image nodes, and each image node including an image that is associated with one or more of a geographic location, a viewpoint orientation and a field of view, wherein the first image corresponds to a first image node within the imagery graph;
    identify a second image node within the imagery graph based on a comparison of the first geospatial data to second geospatial data associated with the second image node; and
    provide a second image corresponding to the second image node for display in response to receiving the indication of the selection of the region within the first image and the identification of the second image node.

11. The system of claim 10, wherein the imagery graph includes representations of geospatial relationships between images of the imagery graph and the one or more processors are further configured to identify the second image node further based on the representations.

12. The system of claim 10, wherein the first image node and the second image node are included in different imagery sets of the imagery graph.

13. The system of claim 12, wherein the different imagery sets store different types of imagery including at least one of a street view panorama, an aerial image, a satellite image, an image from a photograph sharing service, or an image from a video.

14. The system of claim 10, wherein the imagery graph comprises a single data structure including a plurality of image nodes and edges representing connections between the images, and the one or more processors are further configured to the image node is further based on at least one of the edges.

15. The system of claim 10, the one or more processors are further configured to:
    receive indicia of a cursor being hovered within the region; and
    provide a notification that the second image is available responsive to the indicia of the cursor being hovered within the region.

16. The system of claim 15, wherein the notification comprises a transformation of a shape of the cursor.

17. A non-transitory, tangible computer readable medium on which instructions are stored, the instructions when executed by one or more processors, cause the one or more processors to perform a method for navigating imagery graphs, the method comprising:
- receiving an indication of a selection of a region within a first image, wherein the region is associated with a position in the first image that corresponds to first geospatial data;
- accessing a data store containing an imagery graph, the imagery graph including at least one imagery set, each imagery set having one or more image nodes, and each image node including an image that is associated with one or more of a geographic location, a viewpoint orientation and a field of view, wherein the first image corresponds to a first image node within the imagery graph;
- identifying a second image node within the imagery graph based on a comparison of the first geospatial data to second geospatial data associated with the second image node; and
- providing a second image corresponding to the second image node for display in response to receiving the indication of the selection of the region within the first image and the identification of the second image node.

18. The medium of claim 17, wherein the imagery graph includes representations of geospatial relationships between images of the imagery graph and identifying the second image node is further based on the representations.

19. The medium of claim 17, wherein the first image node and the second image node are included in different imagery sets of the imagery graph.

20. The medium of claim 19, wherein different imagery sets store different types of imagery including at least one of a street view panorama, an aerial image, a satellite image, an image from a photograph sharing service, or an image from a video.

21. The medium of claim 17, wherein the imagery graph comprises a single data structure including a plurality of image nodes and edges representing connections between the images, wherein identifying the image node is further based on at least one of the edges.

22. The medium of claim 17, wherein the method further comprises:
- receiving indicia of a cursor being hovered within the region; and
- providing a notification that the second image is available responsive to the indicia of the cursor being hovered within the region.

* * * * *